Dec. 29, 1936. J. J. MELLON 2,065,820
POWER CONTROL FOR MACHINE TOOLS
Filed Jan. 7, 1935

INVENTOR.
James J. Mellon.
BY Slough and Canfield
ATTORNEY.

Patented Dec. 29, 1936

2,065,820

UNITED STATES PATENT OFFICE 2,065,820

POWER CONTROL FOR MACHINE TOOLS

James John Mellon, Cleveland, Ohio, assignor to The Clark Controller Company, Cleveland, Ohio, a corporation of Ohio Application January 7, 1935, Serial No. 686

11 Claims. (Cl. 192—144)

REISSUED

This invention relates to electric control systems and apparatus for controlling the operative movement of cyclically moving machine tools such, for example, as power presses.

The invention relates more particularly to control systems and apparatus for machines of the class referred to which are operatively driven by a continuously operating source of power such as a rotating electric motor. Such machines are coupled to the motor to start and operate them, and to stop them they are uncoupled from the motor and a brake is applied to bring them to rest.

In such cases it is desirable that the brake may be fully released before the clutch, coupling the machine to the motor, engages to start the machine, and that to stop the machine the clutch may be disengaged before the brake is applied; and that the machine may be started and stopped in a manner to prevent the operators thereof from injury and according to a work cycle that will insure efficient operation and maximum production from the machine.

Among the objects of the invention, therefore, are:

To provide an improved control means for controlling the brake and clutch of a power operated press or the like;

To provide an improved electric system and apparatus for controlling machines of the class referred to having a clutch and brake operated by mechanical power;

To provide, for machines of the class referred to having a brake and clutch operated by compressed air, an improved electric control system and apparatus for controlling the application of the compressed air to the brake and clutch;

To provide an improved electric control system and apparatus for power-driven machine tools of the class referred to, to prevent, in an improved manner, accidental unintended starting of the press from rest, and accidental unintended continuous operation of the press;

To provide an electric control system and apparatus for power-driven machines of the class referred to wherein an accidentally developed "ground" connection in the control system or in the electric supply mains leading thereto cannot initiate an operative movement of the machine nor continue it in unintended operation;

To provide generally an improved electric control system and apparatus for machine tools of the class referred to.

Other objects will be apparent to those skilled in the art to which my invention appertains.

My invention is fully disclosed in the following description taken in connection with the accompanying drawing in which Fig. 1 is a front elevational view in simplified form of a power-driven press illustrating, in some respects diagrammatically, the application of my invention thereto;

Figure 3:
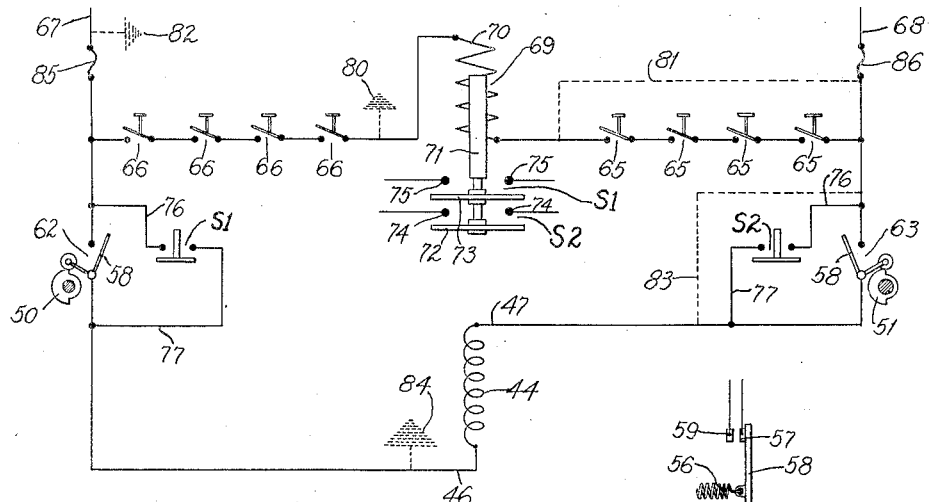
Fig. 3 is a diagrammatic view illustrating a system of electrical connections and apparatus which I may employ for controlling the press of Figs. 1 and 2 according to my invention.

Referring to the drawing, I have shown generally at 1 the main frame of a power press. In the upper part thereof is a transverse shaft 2 supported in suitable bearings in opposite portions of the frame 1 and having a plurality of cranks 3—3 and corresponding connecting rods 4—4 carrying on the lower ends thereof a head 5 guided for vertical reciprocatory movement in laterally disposed guideways 6—6. The frame is provided with a lower head or platen 7, and punching dies, pressing dies or the like may be mounted on the heads 5 and 7 to operate on work pieces disposed therebetween in the usual manner.

Figure 1:
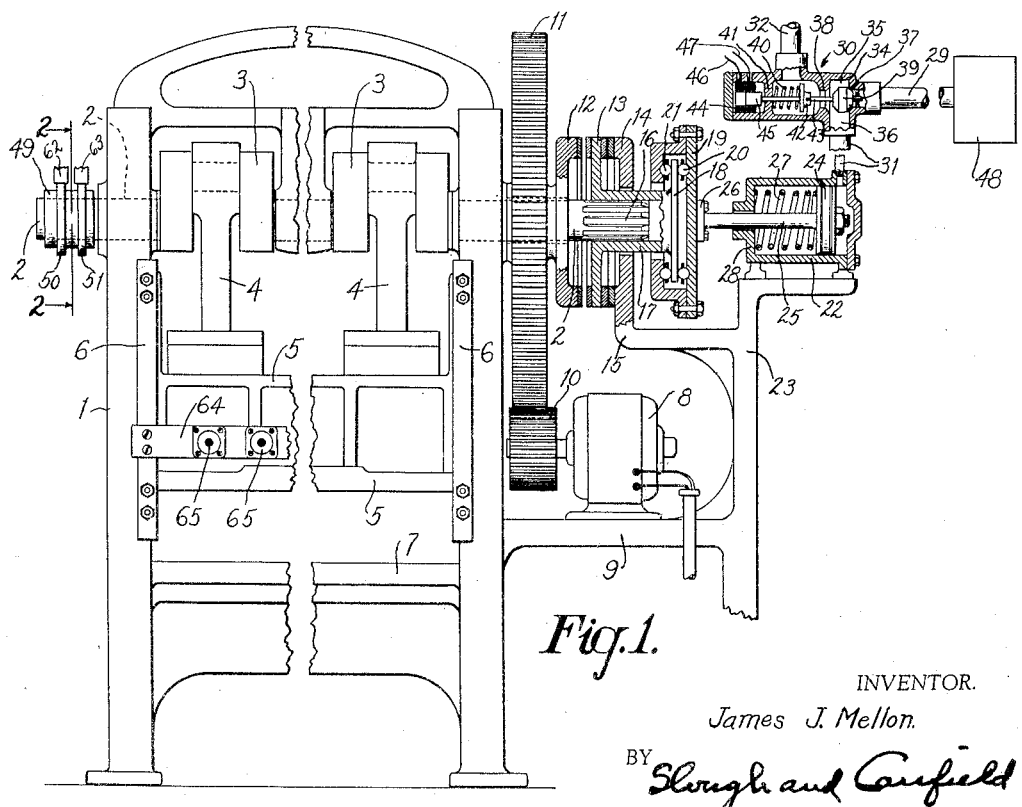

The press, as viewed in Fig. 1, may have any suitable width and may be driven by any necessary number of connecting rods 4—4, the figure being broken apart longitudinally to save space in the drawing.

To drive the machine, an electric motor 8 is supported upon a suitable bracket 9 and is adapted to be started and allowed to run continuously. A pinion 10 on the motor shaft meshes with the gear 11 normally running idle on the shaft 2 but adapted to be clutched to the shaft to drive it by a clutch now to be described. Secured to the gear 11 and rotating therewith is a clutch element 12; normally axially spaced therefrom is a clutch element 13 normally engaged by a clutch element 14. These clutch elements may be of any suitable known construction and are illustrated diagrammatically in the drawing and their exact construction forms no essential part of the present invention. The clutch element 14 is rigidly supported on a frame 15 and the clutch element 13 is splined on the shaft 2. When the clutch element 13 is moved into engagement with the clutch element 14, it will exert a braking action to stop the shaft 2; and when it is axially moved on the splines 16 on the shaft to engage the clutch element 12, it will exert a braking action thereon and the rotating clutch element 12 will rotate the clutch element 13 and through the splines 16 will rotate the shaft 2.

Thus, by alternate axial movements of the clutch element 13, it may start the press shaft 2 by power from the continuously rotating gear 11 or may stop the press by engagement with the clutch element 14 on the stationary frame 15. To thus operatively shift the clutch element 13, the following mechanism is provided.

The clutch element 13 has a hub portion 17 splined to engage the splines 16 on the shaft and outwardly spaced from the clutch element 13 has a head 18 thereon. The head 18 is enclosed within a housing 19 in which are also housed a pair of thrust bearings 20 and 21 of the roller or ball type engaging opposite sides of the head 18. A compressed air cylinder 22 is supported on a stationary bracket 23 and has therein a piston 24 connected to a piston rod 25 extending out of the cylinder 22 and secured as at 26 to the housing 19. A spring 27 in the cylinder 22 rocks at one end upon the piston 24 and at the other end upon the end wall 28 of the cylinder, and thus resiliently thrusts the piston rod 25 and housing 19 toward the right as viewed in the drawing, causing the thrust bearing 21 to engage the head 18 and force the brake element 13 into engagement with the brake element 14.

A conduit 29 leading from a source of compressed air and controlled by a valve device 30 to be described communicates with a conduit 31 which in turn communicates with the interior of the cylinder 22 on the side of the piston 24 opposite the spring 27. When air is admitted to the cylinder through the conduit 31 in a manner to be described, it will force the piston 24 toward the left as viewed in the drawing compressing the spring 27 and, moving the housing 19 to cause the thrust bearing 20 to engage the head 18 and move it and the clutch element 13 therewith to cause the latter to engage the clutch element 12 to start the shaft 2 and the press.

Upon operation of the valve device 30, the conduit 31 may be caused to communicate with a discharge conduit 32 open to the atmosphere whereupon the spring 27 may move the piston 24 to discharge the air from the cylinder 22 and to cause the clutch elements 13 and 14 to stop the press in a manner that will now be clear.

Preferably, the valve device 30 is electrically actuated and constructed so that upon electric energization or actuation thereof, the conduit 29 may be connected with the conduit 31 for the purposes described, and whereby upon de-energizing it the conduit 31 may be connected with the conduit 32 for the purposes described.

Any suitable construction of valve device for this purpose may be employed. In the form illustrated in the drawing and which for simplicity of illustration is to a larger scale than other parts of Fig. 1, I have shown a housing 34 having a chamber 35 therein communicating by a passageway 36 with the conduit 31, communicating with the conduit 29 by a valve seat or port 37, and communicating with the conduit 32 by a valve seat or port 38. A valve element 39 is normally pressed upon the valve port 37 to close it by a spring 40 abutting at one end upon an abutment 41 in the housing and at its other end upon a collar 42 on a stem 43 connected to the valve element 39.

An electro-magnet comprising a winding 44 and a plunger 45 connected to the stem 43 is provided whereby when the winding 44 is energized by current supplied thereto through supply wires 46 and 47, the plunger 45 may be attractively moved to pull the stem 43 in the direction to move the valve element 39 from its normal position closing the port 37 to its operated position closing the port 38. The electro-magnetic unit comprising the winding 44 and the plunger 45 may be of any suitable construction.

By means of the apparatus thus far described, it will now be apparent that upon energizing the winding 44, compressed air will be admitted from the source to the cylinder 22 to successively disengage the brake and engage the clutch to start the press, and upon de-energizing the winding 44, communication will be established from the cylinder to the atmosphere and the spring 27 will discharge the air from the cylinder and, successively, release the clutch and set the brake to stop the press.

To supply the compressed air, any suitable apparatus may be provided and I have indicated diagrammatically at 48 any such source of compressed air.

Figure 2:
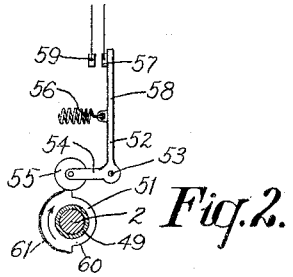
Fig. 2 is a cross-sectional view in semi-diagrammatic form taken approximately from the plane 2—2 of Fig. 1 illustrating a mechanically operated switch which I may employ.

At the left side of the machine as viewed in Fig. 1, the shaft 2 may extend beyond the supporting frame 1 and a sleeve 49 secured to the shaft rotatably supports a pair of cams 50 and 51 for operating each a switch such as that illustrated in Fig. 2. The switch comprises a bell crank shaped arm 52 pivotally supported at 53, a generally horizontal arm 54 carrying a wheel type cam follower 55 engaging the camming surface of the cam 51, resiliently retained in contact therewith by a spring 56. A contact 57 on a generally vertically disposed arm 58 is moved to engage and disengage a contact 59. The cam 51 has portions 60 and 61 respectively of small and large diameter.

In the operation of the switch of Fig. 2, as the shaft 2 rotates, the cam follower 55 will ride from the portion 60 to the portion 61 of the cam and open the contacts 57 and 59 and subsequently will ride down upon the portion 60 of the cam and permit the contacts to be closed by the spring 56.

The switch is shown generally diagrammatically in Fig. 2. Such switches are well known and any suitable construction may be employed in connection with a cam 51 having camming portions 60 and 61 suitably formed to time the operation of the contacts 57 and 59 in a manner and for a purpose to be described.

In the use of presses of this general type, the operators must put the work piece between the upper and lower heads 5 and 7 after the upstroke of the press has begun and must finish this work and remove their hands and arms to safe positions before the head 5 has descended. An electric control system for the air valve operating magnet 44 is provided, operating in connection with switches 62 and 63 and switch operating cams 50 and 51, respectively, to effect stopping of the press at or adjacent the top of its stroke; and in order that the press may not start down until all of the operators have all of their hands in safety positions, a plurality of push buttons is provided, two for each operator, and controlling the valve winding 44.

In Fig. 1, a pair of rails 64, only one of which is shown, is supported on the press extending transversely thereof, and on the rails are mounted push button switches 65, those on the opposite side of the machine being referred to by the reference numeral 66.

In Fig. 3, taken in connection with the other figures, I have illustrated diagrammatically, an electric control system and control apparatus by which a press such as that described above may be operated.

At 44 I have reproduced the valve magnet winding 44 having current supply wires 46 and 47 connected respectively to current mains 67 and 68 through cam-operated switches 62 and 63, respectively. An electro-magnetic switch 69 is provided having a winding 70 and a plunger 71 operating two switches S¹ and S², the switches comprising movable switch elements 72 and 73 adapted when elevated by the plunger 71 to bridge stationary contacts 74—74 and 75—75. The winding 70 is energized across the mains 67 and 68 but with the group of push buttons 65—65 interposed between the winding and the main 68 and the group of push buttons 66—66 interposed between the winding and the main 67.

The switches S¹ and S² respectively bridge or parallel the switches 62 and 63 and to simplify the drawing, the switches S¹ and S² have been reproduced in the diagram as being connected in parallel with the switches 62 and 63 by wires 76 and 77.

The operation of the press in connection with the diagram of Fig. 3 will now be described. It is assumed that the press is at the top of the stroke and is not operatively moving. The cam switches 50 and 51 are in the rotated position of the cam to hold the switches 62 and 63 open. The push button switches 65 and 66 likewise are open. The control magnet winding 44 is therefore de-energized and the brake on the press is set. It is with the parts in this position that the work pieces may be changed in the press without danger to the operators. When each operator has finished his work, he places his hands on two of the push buttons 65 or 66, and these push buttons are so located that not only the operator's hands but his arms and other parts of his body will be out from under the path of the moving head 5 of the press.

When all of the push buttons 65 and 66 have been closed, and not before, the winding 70 of the electromagnetic switch 69 will be energized and will close the switches S¹ and S². Current may now flow from the main 67 to the main 68 through the switch S¹, the winding 44, and the switch S². The winding 44 being energized, compressed air will be admitted from the source 48 to the cylinder 22 to disengage the brake and engage the clutch to start the machine and thus to start the head of the machine downwardly. If either of the operators should remove a hand from either of the push buttons, the winding 70 will be de-energized opening the switches S¹ and S² and de-energizing the winding 44 and setting the brake for stopping the machine.

The cams 50 and 51 of the switches 62 and 63 have their cam faces 60 and 61 so formed that at a predetermined point in the operating stroke of the machine, they will close the switches 62 and 63. As will now be apparent, this point in the stroke of the machine may be before, at, or after the time the head 5 has reached the bottom of the stroke, and in any case being at such a point that it will be safe for the operators to remove their hands from the push buttons without danger of injury. When the switches 62 and 63 have thus been closed by movement of the machine itself, and as will now be clear, this point may be predetermined by suitably forming and positioning the cam surfaces 60 and 61, the operators may remove their hands from the push buttons 65 and 66, de-energizing the switch 69 and allowing the switches 61 and 62 to open, the control winding 44 being maintained energized through the switches 62 and 63.

The press continues to move, completing its operative stroke and starting on the up stroke. When the press has reached a predetermined point in its up stroke likewise determined by the shape and position of the cam surfaces 60 and 61, the switches 62 and 63 will be operated to open, de-energizing the winding 44 and causing the clutch to be disengaged and the brake to be engaged, stopping the machine.

It will now be apparent that the apparatus and control system therefor, above described, not only provides an efficient time saving operation of the press but provides safety features preventing injury to the operators. By providing two switches 62 and 63 in the supply main for the control winding 44, and by placing some of the push buttons such as 65 between the winding 70 and one of the mains 68, and others of the push buttons, 66, between the winding 70 and the other supply main 67, the press is prevented from starting unexpectedly or from repeating its cycle continuously upon the accidental development of ground connection in the main 67 or 68 supplying current to the control system, or in the circuits local to the control system itself.

For example, if only the push buttons 66 were employed, that is, if push buttons were provided only between one supply main such as 67 and the winding 70, the result would be the same as if dotted line connection 81 were provided instead of push buttons 65. With such an arrangement, if a ground 80 should develop connecting one terminal of the winding 70 to the ground and a ground 82 connecting the main 67 to the ground should subsequently develop, the winding 70 would thereby be connected to the mains 67 and 68, current flowing from the main 68 through the wire 81, winding 70 and to the ground at 80, and thence by ground to 82, and to the main 67, and the switches S¹ and S² would thereby be closed permanently and the press would unexpectedly start; and if this should occur unexpectedly operators at the press might be injured.

Again, if only one of the cam operated switches were employed, such as the switch 62, the conditions would be the same as if a wire 83 bridged the switch 63. With such an arrangement, if a ground 84 should develop connecting one terminal of the winding 44 to the ground, and then a ground 82 should develop, current could flow from the main 68 to the wire 83, winding 44, and to the ground at 84, and through the ground to 82, and thence to the main 67, thus permanently connecting the winding 44 across the mains and causing the press to not only unexpectedly start but to operate continuously, repeating its cycle, and possibly injuring the operators.

But, by applicant's arrangement whereby push buttons are disposed between each side of the winding 70 and the supply mains 67 and 68, and whereby both supply mains to the winding 44 are opened by cam operated switches 62 and 63, there is no place in the system where the occurrence of an accidental ground can cause the machine to unexpectedly start or to repeat its cycle unexpectedly. Any other combination of grounds which can develop and which might conceivably effect energization of the control winding 44 or the winding 70 of the switch 69 will provide a short circuit connection between the mains 67 and 68 which would blow fuses 85 or 86. Thus the operators are at all times protected from accidental starting or accidental repeating of the cycle of the press.

When it is desired to effect a so-called inching movement of the head 5 in setting up the press for work, the push button switches 65 and 66 may be of the type adapted to be locked in the closed position and all of them may be so locked except one and this switch may be operated by a foreman or other operator in charge of the work, and by momentarily closing such push button, a short interval engagement of the clutch may be effected for inching purposes.

As an alternative method of effecting inching, all of the push buttons except one may be held closed by operators and the remaining push button momentarily closed by the man in charge of the work to momentarily engage the clutch to effect an inching operation.

My invention is not limited to the exact details of construction illustrated and described. Changes and modifications may be made in the embodiment of my invention illustrated and described hereinbefore without departing from the scope and spirit of my invention or sacrificing its advantages.

I claim:

1. In combination with a machine and a source of power for operatively cyclically moving it, a mechanically operable clutch for coupling the machine to the source to move it, a mechanically operable brake for stopping the machine, a source of mechanical power for operating the brake and clutch comprising a device operable by fluid pressure and a source of supply of fluid pressure and conduit means communicating with the source and the device, control means comprising an electrically actuable valve controlling flow through the compressed air conduit means and manually controlled means controlling the electrically actuable valve to effect operation of the brake to release the machine and operation of the clutch to start it, and means rendering the electrically actuable valve operable by the machine at a predetermined point in its cycle to effect operation of the clutch to uncouple the machine from the source and operation of the brake to stop it.

2. In combination with a machine and a source of power for operatively cylically moving it, a clutch for coupling the machine to the source to move it, a brake for stopping the machine, a source of mechanical power for operating the brake and clutch comprising a device operable by fluid pressure and a source of supply of fluid pressure and conduit means communicating with the source and the device, control means comprising an electrically actuable valve controlling fluid flow through the conduit means and manually controlled means controlling actuation of the valve to effect operation of the brake to release the machine and operation of the clutch to initiate movement of the machine, means operable by movement of the machine at a predetermined point in its cycle to maintain control of the valve to continue movement of the machine initiated by the manually controlled means, and means rendering the electrically actuable valve operable by the machine at another predetermined point in its cycle to effect operation of the clutch to uncouple the machine from the source and operation of the brake to stop it.

3. In combination with a machine and a source of power for operatively cyclically moving it, a mechanically operable clutch for coupling the machine to the source to move it, a mechanically operable brake for stopping the machine, a source of mechanical power for operating the brake and clutch comprising a device operable by fluid pressure and a source of supply of fluid pressure and conduit means communicating with the source and the device, control means comprising an electrically actuable valve controlling fluid flow through the conduit means, and electrically controlled switches having contacts controlling the electrically actuable valve, and manually controlled means controlling the electrically actuable switch to effect actuation of the valve to effect operation of the brake to release the machine and operation of the clutch to initiate movement thereof, a switch having means rendering it operable by movement of the machine at a predetermined point in its cycle to cause it to maintain said actuation of the electrically actuable valve to effect continued movement of the machine, and means for operating the said machine-operable switch by movement of the machine at another point in its cycle to control actuation of the electrically actuable valve to effect operation of the clutch to uncouple the machine from the source and operation of the brake to stop it.

4. In combination with a machine and a source of power for operatively cyclically moving it, a mechanically operable clutch for coupling the machine to the source to move it, a mechanically operable brake for stopping the machine, a source of mechanical power for operating the clutch and brake, control means therefor comprising an electrically actuable means, a pair of current supply mains for supplying current to the electrically actuable means, a manually controlled switch between each supply main and said electrically actuable means for controlling the latter; to effect, when jointly operated, operation of the electrically actuable means to effect application of mechanical power to operate the brake to release the machine and operate the clutch to start the machine, and either of said switches adapted when restored to restore the electrically actuable means.

5. In combination with a machine and a source of power for operatively cyclically moving it, a mechanically operable clutch for coupling the machine to the source to move it, a mechanically operable brake for stopping the machine, a source of mechanical power for operating the clutch and brake comprising a device operable by compressed air and a source of supply of compressed air and conduit means communicating with the source and the device, control means therefor comprising an electrically controlled valve controlling the compressed air conduit, a pair of current supply mains for supplying current to the electrically controlled valve, a manually controlled switch between each supply main and said electrically controlled valve for controlling the latter, to effect when jointly operated application of compressed air to the device to operate the brake to release the machine and operate the clutch to start the machine, and either of said switches adapted when restored to interrupt actuation of the electrically controlled valve to prevent accidental continuous operation of the machine upon accidental development of a ground connection to one of said supply mains and a local ground connection to said electrically controlled valve.

6. In combination with a machine tool, a source of power for operatively cyclically moving it, a mechanically operable clutch for coupling the machine to the source to move it, a mechanically operable brake for stopping the machine, a source of mechanical power for operating the brake and clutch, control means therefor comprising an electrically actuable means, a pair of current supply mains for supplying current to the electrically actuable means, manually controlled means controlling current to the electrically actuable means to effect application of power to the brake and clutch to release the brake and engage the clutch to start the machine, a pair of switches respectively controlling the pair of supply mains, the switches having means operable by movement of the machine at a predetermined point in its cycle to open the switches, and either switch upon opening interrupting current to the electrically actuable means to effect release of the clutch and engagement of the brake to stop the machine, and both switches upon opening preventing accidental continuous operation of the machine upon the accidental development of a ground connection to one of said supply mains and a local ground connection to the electrically actuable means.

7. In combination with a machine tool, a source of power for operatively cyclically moving it, a mechanically operable clutch for coupling the machine to the source to move it, a mechanically operable brake for stopping the machine, a source of mechanical power for operating the brake and clutch comprising a device operable by compressed air and a source of supply of compressed air and a conduit communicating with the source and the device, control means therefor comprising an electrically actuable valve controlling the conduit, a pair of current supply mains for supplying current to the electrically controlled valve, manually controlled means controlling current to the electrically controlled valve to effect application of power to the brake and clutch to release the brake and engage the clutch to start the machine, a pair of switches respectively controlling the pair of supply mains, the switches having means operable by movement of the machine at a predetermined point in its cycle to open the switches, and either switch upon opening interrupting current to the electrically actuable valve to effect release of the clutch and engagement of the brake to stop the machine, and both switches upon opening preventing accidental continuous operation of the machine upon the accidental development of a ground connection to one of said supply mains and a local ground connection to the electrically actuable valve.

8. In combination with a machine and a source of power for operatively cyclically moving it, a mechanically operable clutch for coupling the machine to the source to move it, a mechanically operable brake for stopping the machine, a source of mechanical power for operating the clutch and brake comprising a device operable by compressed air and a source of supply of compressed air and conduit means communicating with the source and the device, control means therefor comprising an electrically controlled valve controlling the compressed air conduit, a pair of current supply mains for supplying current to the electrically controlled valve, a manually controlled switch between each supply main and said electrically controlled valve for operating the latter, to effect when jointly operated application of compressed air to the device to operate the brake to release the machine and operate the clutch to start the machine, and either of said switches adapted when restored to effect restoring of the electrically controlled valve to prevent accidental continuous operation of the machine upon accidental development of a ground connection to one of said supply mains and a local ground connection to said electrically controlled valve.

9. In combination with a machine tool, a source of power for operatively cyclically moving it, a mechanically operable clutch for coupling the machine to the source to move it, a mechanically operable brake for stopping the machine, a source of mechanical power for operating the brake and clutch, control means therefor comprising an electrically actuable means, a pair of current supply mains for supplying current to the electrically actuable means, manually controlled means controlling current to the electrically actuable means to effect application of power to the brake and clutch to release the brake and engage the clutch to start the machine, a pair of switches respectively controlling the pair of supply mains, the switches having means operable by movement of the machine at a predetermined point in its cycle to operate the switches, and either switch upon operating controlling current to the electrically actuable means to effect release of the clutch and engagement of the brake to stop the machine, and both switches upon operating preventing accidental continuous operation of the machine upon the accidental development of a ground connection to one of said supply mains and a local ground connection to the electrically actuable means.

10. In combination with a machine tool, a source of power for operatively cyclically moving it, a mechanically operable clutch for coupling the machine to the source to move it, a mechanically operable brake for stopping the machine, a source of mechanical power for operating the brake and clutch comprising a device operable by compressed air and a source of supply of compressed air and a conduit communicating with the source and the device, control means therefor comprising an electrically actuable valve controlling the conduit, a pair of current supply mains for supplying current to the electrically controlled valve, manually controlled means controlling current to the electrically controlled valve to effect application of power to the brake and clutch to release the brake and engage the clutch to start the machine, a pair of switches respectively controlling the pair of supply mains, the switches having means operable by movement of the machine at a predetermined point in its cycle to operate the switches, and either switch upon operating controlling current to the electrically actuable valve to effect release of the clutch and engagement of the brake to stop the machine, and both switches upon operating preventing accidental continuous operation of the machine upon the accidental development of a ground connection to one of said supply mains and a local ground connection to the electrically actuable valve.

11. In combination with a machine and a source of power for operatively cyclically moving it, a mechanically operable clutch for coupling the machine to the source to move it, a mechanically operable brake for stopping the machine, a source of mechanical power for operating the brake and clutch, control means therefor comprising an electrically actuable means, a pair of current supply mains for supplying current to the electrically actuable means, a manually controlled switch between each supply main and said electrically actuable means for controlling the latter to effect, when jointly operated, operation of the brake to release the machine and engagement of the clutch to start the machine, and either of said switches adapted when restored to interrupt actuation of the electrically actuable means to prevent accidental continuous operation of the machine upon accidental development of a ground connection to one of said supply mains and a local ground connection to said electrically actuable means.

JAMES JOHN MELLON.